United States Patent [19]
Price

[11] Patent Number: 5,230,455
[45] Date of Patent: Jul. 27, 1993

[54] SELF-SUPPORTING FILTER UNITS

[75] Inventor: Frank C. Price, Leicester, United Kingdom

[73] Assignee: British United Shoe Machinery Limited, Belgrave, England

[21] Appl. No.: 872,434

[22] Filed: Apr. 23, 1992

[30] Foreign Application Priority Data

Nov. 11, 1991 [GB] United Kingdom ............... 9123926

[51] Int. Cl.⁵ .................... B65H 23/24; B01D 29/37; B01D 46/02
[52] U.S. Cl. ...................................... 226/88; 55/381; 55/497; 55/521; 55/528; 55/DIG. 5; 493/941
[58] Field of Search .................... 55/361, 380-382, 55/484, 497, 514, 521, 528, DIG. 5; 210/493.1; 226/88; 493/920, 941

[56] References Cited

U.S. PATENT DOCUMENTS

| | | | |
|---|---|---|---|
| 2,576,864 | 11/1951 | Valente | 55/DIG. 5 |
| 2,980,208 | 4/1961 | Neumann | 55/521 X |
| 3,124,440 | 3/1964 | Hogg | 55/484 |
| 3,386,227 | 6/1968 | Czerwonka | 55/521 X |
| 3,386,231 | 6/1968 | Nutting | 55/484 X |
| 3,410,062 | 11/1968 | Hart | 55/521 X |
| 3,537,241 | 11/1970 | Wiegel et al. | 493/941 X |
| 3,568,412 | 3/1971 | Schwab | 55/521 X |
| 3,622,446 | 11/1971 | Burnham | 55/528 X |
| 3,774,375 | 11/1973 | Smith | 55/382 |
| 3,807,147 | 4/1974 | Schoonen et al. | 55/381 X |
| 4,056,375 | 11/1977 | Ringel et al. | 55/514 X |
| 4,154,587 | 5/1979 | Gerok | 55/521 X |
| 4,938,739 | 7/1990 | Nilsson | 493/941 X |
| 4,940,500 | 7/1990 | Tadokoro et al. | 493/941 X |
| 4,976,677 | 12/1990 | Siversson | 55/521 X |

FOREIGN PATENT DOCUMENTS

| | | | |
|---|---|---|---|
| 0250801 | 1/1988 | European Pat. Off. | 55/497 |
| 2137309 | 2/1973 | Fed. Rep. of Germany | 55/521 |
| 2304882 | 8/1974 | Fed. Rep. of Germany | 55/521 |
| 56-010312 | 2/1981 | Japan | 55/521 |
| 0557191 | 12/1974 | Switzerland | 55/521 |

*Primary Examiner*—Robert Spitzer
*Attorney, Agent, or Firm*—Owen J. Meegan; Aubrey C. Brine

[57] ABSTRACT

A filter unit is made of two portions (14) of rigid corrugated material secured together along lands (50,52) extending parallel with the corrugations and, if desired, intermediate them, and also along lands (54) formed along one end of the corrugations, thus closing the passages formed when the two portions (14) are secured together. Suitable fastenings are adhesive bonding, and metallic fasteners, e.g. eyelets, or stitching. Further flanges (56) may be provided for facilitating a connection with a suitable suction or other air-drawing source; also if desired, such further lands (56) may be outflanged for facilitating such connection. Apparatus for forming the sheet material is also provided whereby material from a continuous supply is progressively formed between two sets of blade members (102), the blade members being moved sequentially and alternately (as between the two sets) into forming engagement with the sheet material. The blade members are preferably heated in order to treat the material being formed to render it rigid. The apparatus further may comprise a severing blade (112) by which the thus formed material is cut into suitable portions (14).

11 Claims, 7 Drawing Sheets

Fig_1

SELF-SUPPORTING FILTER UNITS

BACKGROUND OF THE INVENTION

This invention is concerned with a method of manufacturing a self-supporting filter unit, an apparatus suitable for use in carrying out such a method, said apparatus including a forming assembly, and also a self-supporting filter unit made using such a method.

Known dust filter units are in the form of bags which are supported against collapse by a framework of metal or other suitable material, air to be filtered being sucked through the bags from outside to the interior thereof so that dust particles and/or other debris are prevented by the material of the bags from passing to the interior and thus collected on the outer surface; the pore size of the fabric of these filter bags is selected according to the size of dust particles to be filtered from the gas flow.

Self-supporting filter units, i.e. units which do not require a framework of metal or other suitable material, are available; one such unit is supplied under the trademark "SINTAMATIC" by DCE Limited of Thurmaston, Leicester. This filter unit comprises a porous composite which is rigid and self-supporting, being made by a process in which a blend of granulated engineering polymers is dimensionally restrained and processed to produce a rigid porous composite element. The surface of this element is then treated with a P.T.F.E.-based solution to form a micro-porous skin. While this self-supporting filter has been shown to be generally satisfactory in performance, it is somewhat expensive to provide and the production process is relatively complex.

OBJECTS OF THE INVENTION

It is thus one of the various objects of the present invention to provide an improved method of manufacturing a self-supporting filter unit implementation of which is less expensive and more readily achievable than previous methods.

It is another of the various objects of the present invention to provide a forming assembly for use in forming flexible non-woven fabric sheet materials to provide corrugations therein and subsequently for treating such material whilst in its corrugated configuration, such assembly being especially useful in the manufacture of self-supporting filter units.

SUMMARY OF THE INVENTION

The invention thus provides in one of its several aspects a method of manufacturing a self-supporting filter unit comprising forming a flexible non-woven fabric sheet material to provide corrugations therein, treating the material to render it rigid whilst in its corrugated configuration, and securing two portions of the rigid corrugated material together with corrugations parallel, the portions being secured together in such a manner that the peaks provided by the corrugations are in opposed relation and thus the valleys between the peaks are in register, each opposed pair of valleys providing a passage having air-permeable walls through which, in the finished unit, air to be filtered can pass and be drawn off but which prevent the passage therethrough of dust and/or other debris, wherein in forming the material lands are provided at spaced intervals between the corrugations in the plane of the peaks thereof and extending parallel with the corrugations, and wherein the portions of the material are secured together along the lands.

It will be appreciated that, by the provision of lands at spaced intervals between the corrugations, which lands provide a more effective area over which the two portions of material can be secured together, a more reliable filter unit is provided, and at the same time the handling of the portions prior to their being secured together is facilitated.

In order to enhance the securing of the portions together, preferably in forming the material a further land is provided also in the plane of the peaks of the corrugations and extending transversely of the corrugations formed in the material, and thereafter in securing the portions of material together the further lands provided in the portions are arranged in opposed relation, thus serving to close one end of the passages provided by the corrugations, and are secured together. Furthermore, it has been found advantageous to provide a still further land in the sheet material, also extending transversely of the corrugations but in the plane of the bottoms of the valleys thereof, and, in securing the portions of material together, said still further lands are held spaced apart, thus to form in the finished filter unit an opening into which all the passages open and in which a connection to a suction unit can be accommodated. Alternatively, and in a preferred embodiment, said still further land is flanged outwardly from the plane of the bottoms of the valleys of the corrugations about a line passing through said bottoms, thus to form a connecting piece into which the passages open and by which the unit can be connected to a suction source.

In this way, it will be appreciated, effectively an integral frame can be provided around the whole of the filter unit manufactured in accordance with this method and also in this integral unit is provided a facility for connecting the finished filter unit to a suction source. In carrying out the method in accordance with the invention the portions of sheet material may be secured together as aforesaid by adhesive bonding or by eyeletting or other suitable metallic fastenings. In addition, if desired, and for extra security, the peaks in the material may also be secured together by adhesive bonding.

The fabric sheet material used in carrying out the method in accordance with the invention preferably contains fibers which will desirably be selected according to the use to which the filter is to be put, will have suitable decitex and will be formed into a fiber fabric by one of the known production techniques for non-woven fiber fabric to provide a desired fabric density. One such technique involves the production of a fiber felt by a carding and needle punching process, the weight per unit area of the felt, the needle size and the needle punch density being selected according to the desired final application. Thus, in one example the fiber fabric is a non-woven fabric made from polyimide fibers which become rigid when heated at temperatures above the glass transition temperature of the fibers. One suitable polyimide fiber is supplied under the designation P84 by Lenzing AG. P84 fibers have a strong tendency, especially when heated to the glass transition temperature, which is in the order of 315° C., to shrink and in this way the fabric made therefrom accurately takes the shape of the formers and/or presser members, providing a well-defined filter unit with well-finished surfaces and good internal strength to render the filter self-supporting.

Instead of using fibers which rigidise upon being heated, a non-woven fabric made from thermoplastic fibers may be used. In this case, it is important, in order to maintain the air-permeability of the material, that the fibers are not in fact melted but are in fact heated close to their melting point firstly to provide a degree of shrinkage, in order to ensure a well-defined filter unit, and secondly in order to soften the fibers and cause them to bond together without however forming a continuous film. One such material is made from polyphenylene sulphide fibers, more particularly a fiber obtained from Phillips Fibers Corporation under the designation Ryton PPS fibers. Such fibers have a melting point in the order of 285° C. and are capable of operating at temperatures up to 190° C. on a continuous basis, or somewhat higher temperatures in surges. In addition these fibers have excellent resistance to a wide range of acids and alkalines and are not soluble in any known solvent below 200° C. Furthermore, the material made from such fibers is classified as non-inflammable.

As an alternative to thermoplastic fiber, polyester fiber may be used generally in the same manner as in using the Ryton fibers. In this case of course the melt temperature of the fibers is somewhat lower, being in the order of 240° C., and self-supporting filter units from fabrics comprising polyester fibers are clearly useful only at much lower operating temperatures than the Ryton fiber fabric or the P84 fiber fabric. Nevertheless, a satisfactory self-supporting filter unit can be produced from such fabrics using the process in accordance with the present invention.

It is also possible to use fiber fabrics which are made from mixtures of fibers. For example, one material which has been found suitable comprises 55 to 80 parts by weight polyester fibers and 45 to 20 parts by weight polypropylene fibers, the actual ratio of polyester fibers to polypropylene fibers being 70:30 parts by weight. In this case, it will be appreciated, the polypropylene fibers have a lower melt temperature than the polyester fibers so that it is possible, by the application of heat to a temperature above the melt temperature of the polypropylene but below the melt temperature of the polyester, to melt the polypropylene fibers and carse the molten polypropylene to flow among the polyester fibers to bond them together, the application of heat at the same time causing significant shrinkage of the polypropylene fibers and shrinkage also, but to a lesser extent, of the polyester fibers, so that the fabric closely conforms to the shape of the formers and/or press members, resulting in a well-defined filter unit having good self-supporting properties.

As yet another example, moreover, the fabric may be made up of a mixture of bi-component fibers and other suitable fibers, where at least 5% parts by weight of bi-component fibers are used. The feature of bi-component fibers is of course that one of the components has different properties from the other, usually a lower melt point, so that again by the application of heat up to the melt temperature of the one component, but falling short of the melt temperature of the other component, said one component can flow and serve to bond not only the other fibers, but also the other component of the bi-component fibers with a result that the fabric is stiffened, the application of heat at the same time usually causing shrinkage to some extent of all the fibers, resulting in a well-defined filter unit having good self-supporting properties.

As a further alternative, a non-woven fabric may be used which is impregnated with a suitable quantity of a resinous stiffening material which material may stiffen with or without the application of heat. Such stiffening material may be supplied as a latex with a relatively low pick-up, e.g. 10% to 30% by weight of the non-woven fiber fabric. As examples of such a latex, furthermore, reference is made to styrene homopolymer and copolymer latices.

Within the scope of the invention, furthermore it is contemplated that multi-layer fabrics may be used, the various layers exhibiting different desirable properties for the production of a self-supporting filter unit. For example, an outer surface layer would desirably provide for easy release of dust and/or other debris adhering thereto, while an inner surface layer would have no tendency to adhere to the formers during the manufacturing process, and in addition each layer of the fabric would exhibit one or both of the following properties, namely good filtration of air passing therethrough and the necessary rigidity to render the filter unit self-supporting.

In carrying out a preferred method in accordance with the invention, furthermore, the sheet material is progressively formed to provide the corrugations and the lands, therein, each section of the material thus formed being treated to render it rigid prior to the forming of a next-following section.

The invention further provides, in another of its several aspects, a forming assembly for forming flexible non-woven fabric sheet material to provide corrugations therein and subsequently for treating such material whilst in its corrugated configuration, comprising a clamp arrangement having two elongated clamp members each having a flat clamp surface, two opposed corrugating tools aligned with one another such that the peaks of the corrugating surface of one tool mate with the valleys of the corrugating surface of the other, and means for effecting relative movement of approach and separation between the clamp members and also between the corrugating tools, whereby material disposed therebetween can be formed into a corrugated configuration with a land extending parallel to the corrugations, wherein each corrugating tool comprises a plurality of elongated blade members, each extending parallel with the clamp members and each having a material-engaging end portion of generally triangular cross-section thus to provide an elongated peak and a valley being thus formed between the peaks of adjacent blade members, and wherein with a portion of sheet material held clamped by the clamping members and extending between the corrugating tools, the means for effecting relative movement between said tools is effective to advance each blade member of at least one of said tools in sequence, starting with the blade member whose peak is most closely adjacent the clamp members and thereafter the next most closely adjacent and so on.

It will thus be appreciated that using such a forming assembly a "progressive" sheet-forming operation can be effected as part of the aforementioned method of manufacturing filter units, the material thus being formed in relatively long lengths from which portions can be obtained for the formation of filter units as aforesaid.

Preferably in using an assembly as referred to above the blade members of both tools are thus advanced in sequence, the arrangement thus being such that alternately a blade member of one tool and then a blade member of the other are thus advanced. In this way it can be more readily ensured that the material is evenly distributed between the blade members as they are progressively closed onto it.

Conveniently, moreover, one of the clamping members is formed integral with one of the blade members of one of the tools, and the other tool has associated with it a separate clamping member having a cut-away portion forming a side of a valley-cooperating with the peak of said one blade member of said one of the tools.

For the treatment of materials which are rendered rigid as aforesaid by the application of heat, furthermore, preferably, heating means is provided for heating the tools to a temperature at which the fabric sheet material therebetween is rendered rigid.

In a preferred embodiment of the forming assembly each blade member has a flat forming face extending transversely of the corrugations adjacent one end thereof whereby as the blade members are moved together an edge portion of the material is clamped between the flat forming surface of the cooperating members thus progressively to form a land along said edge portion; in such a case, moreover, the flat surfaces of the blade members of one of the tools lie in the plane of the bottoms of the valleys of the corrugated surfaces thereof, while those of the other of the tools lie in the plane of peaks of the corrugated surfaces thereof. Similarly, in said preferred embodiment each blade member has a further flat forming surface extending transversely of the corrugations thereof for forming a land along the opposite edge portion of the material and, furthermore, in the blade members where the flat surfaces adjacent one end are in the plane of the peaks of the corrugated surfaces thereof, those adjacent the other end are in the plane of the bottoms of the valleys of said surfaces, and vice versa. It will thus be appreciated that, in using this preferred embodiment of the forming assembly, the additional lands formed by the flat forming surfaces provide the closures and also the facility for providing a connection to a suction source, as described earlier in relation to the method of manufacture.

The invention also provides, in another of its several aspects, an apparatus suitable for use in the manufacture of filter units from flexible non-woven fabric sheet material, comprising an assembly as set out above, means for feeding the material through the apparatus from a continuous supply, and severing means for severing formed rigid portions from the material, wherein the feed means comprises cooperating members providing a complementary peak-and-valley arrangement for engaging in one or more corrugations in the formed rigid material, and means for moving the members bodily through a predetermined distance equivalent to the dimension of the tools as measured in the direction of feed of the material, whereby the material is fed section-by-section through the apparatus, each section comprising a plurality of configurations with a parallel land at one end thereof.

Using such an apparatus, it will be appreciated, a progressive forming operation can thus readily be achieved. Moreover, preferably the severing means is disposed in a position such that as each section of material is fed as aforesaid the land provided by the clamping means is positioned in opposed relation with the severing means and thus the section is severed along said land. In this way the land is effectively divided into two so that along each edge of a portion from which a filter unit is to be formed by being secured to another portion, a sufficient area is provided along such edge to ensure that the two portions are properly and reliably secured together.

The feed means of said apparatus is preferably of the orbital type, i.e. advances in contact with the material in one direction and then is subsequently returned in an opposite direction, out of contact with the material, to its initial position, and in such a case preferably a further clamp arrangement is provided, comprising further cooperating members also providing a complementary peak-and-valley arrangement and engageable also with a formed rigid portion of the material, whereby the material is held in position during return movement, out of engagement with the material, of the cooperating members of the feeding means.

In order to ensure that the material is held securely and is positioned accurately laterally of the apparatus as it is fed therethrough, furthermore, preferably the means for feeding the material also comprises means for holding the material long outside edges thereof along the feed direction. Such means may be in the form of e.g. stentering pins mounted on continuous belts along each side of the feed path of the material.

The invention still further provides, in yet another of its several aspects, a self-supporting filter unit comprising two portions of a rigid sheet material formed with corrugations and bounded at each side by a land, the portions being secured together along said lands such that the corrugations of the portions are disposed peak-to-peak whereby passages are formed thereby, said passages being defined by wall portions which are air-permeable and through which air can pass and be drawn off but which prevent the passage therethrough of dust and/or other debris, wherein each portion also has a further land, extending transversely of the corrugations and in the plane of the peaks of the corrugations, said further lands also being secured together thus to close one end of each of the passages.

BRIEF DESCRIPTION OF THE DRAWINGS

The above and other of the various objects and several aspects of the invention will become clearer from the following detailed description to be read with reference to the accompanying drawings, of a method of manufacturing a self-supporting filter unit, an apparatus including a forming assembly and a self-supporting filter unit. It will of course be appreciated that the method, apparatus (including an assembly) and unit to be described hereinafter have been selected for description In the accompanying drawings.

DESCRIPTION OF THE PREFERRED EMBODIMENT

Figure 1:
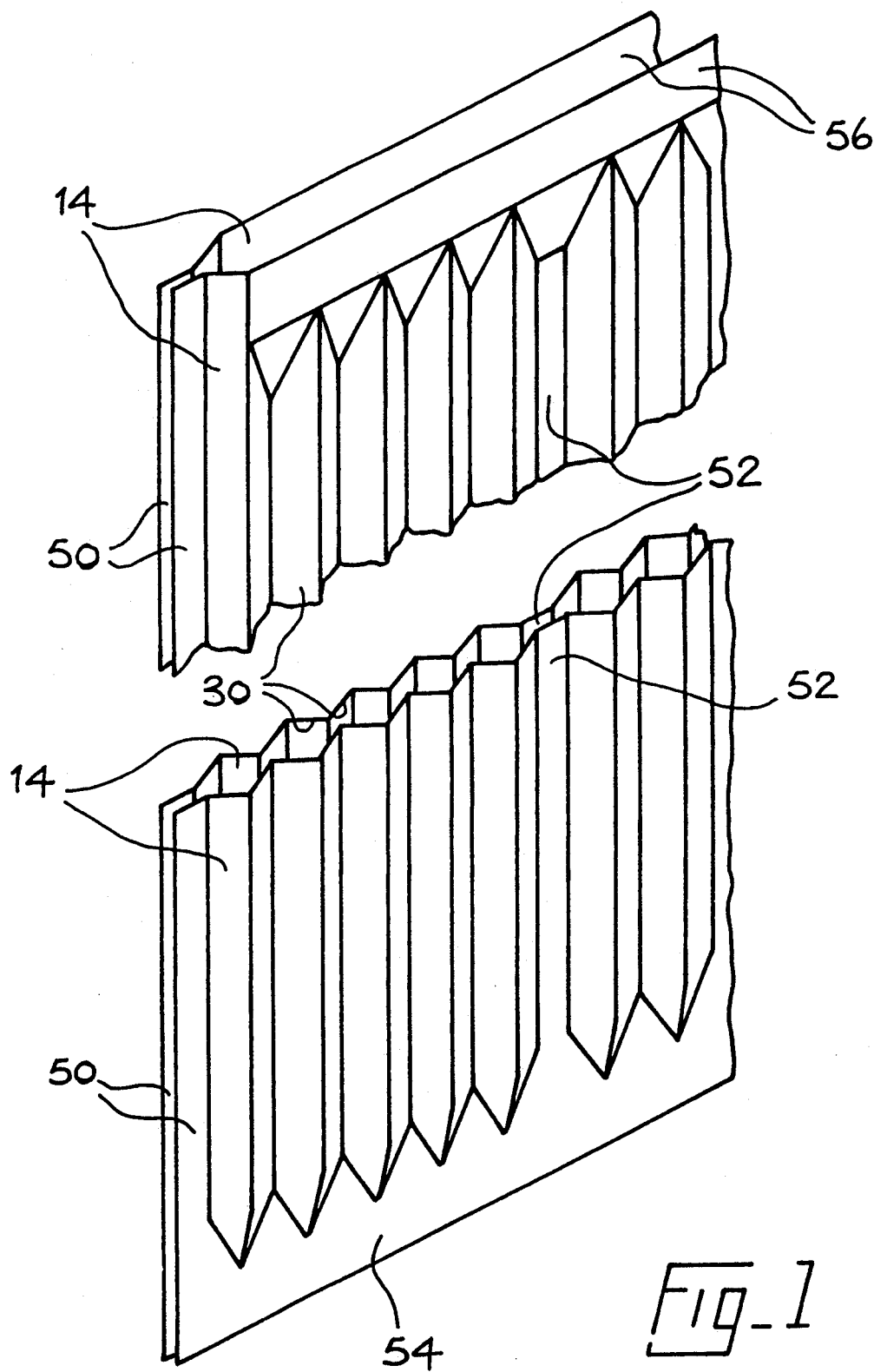
FIG. 1 is a perspective view showing two portions of fabric sheet material which have been formed and which, when secured together, will constitute a filter unit in accordance with the invention.

With reference to FIG. 1, two portions 14 of a flexible fiber fabric sheet material are placed in opposed relationship. Each portion 14 has a corrugated configuration, providing therein valleys 30 separated by peaks, and the peaks of each portion are disposed opposite one another. The corrugations extend parallel with one another and at opposite ends of the rows of corrugations and extending parallel therewith are lands or flanges 50 (only end being shown in FIG. 1) which again are in opposed relationship. In addition, at intermediate positions between the corrugations are further lands or flanges 52, again arranged in opposed relationship. The lands or flanges 50, 52 are relatively wide in relation to the peaks of the corrugations and provide regions in which the two portions 14 of sheet material can be secured together in a reliable manner.

A further land or flange 54 is also provided, extending transversely of the direction of the corrugations, along a bottom edge of each portion 14, the arrangement being such that, as can be seen from Figure 1, the land or flange 54 lies in a plane in which the peaks of the corrugations are disposed; that is to say, the corrugations themselves project from the plane of the flange 54. Furthermore, the flanges 50, 52 are in the same plane as the flange 54. In this way, an integral "frame" is provided around three sides of each portion 14 and thus, in the finished filter unit when the flanges are secured together, around three sides of the unit itself.

At the top end of each portion 14, furthermore, is another land or flange 56, which also extends transversely of the direction of the corrugations. In this case, however, the flange 56 of each portion lies not in the plane of the flanges 50, 52, 54 but rather in the plane of the bottoms of the valleys 30 provided by the corrugations. It will thus be appreciated that, when the two portions 14 are, as shown in FIG. 1, arranged in opposed relationship, thus forming therebetween an opening in which a suitable connection, by which passages formed by the valleys of the portions can be connected to a suction or an air-drawing source.

Various material may be used from which the portions 14 of sheet material can be made. For example, each portion may comprise a portion of a non-woven fiber felt produced using a blend of 50% by weight 1.7 decitex/60 mm and 50% by weight 3.3 decitex/60 mm staple polyimide fibers supplied under the designation P84 by Lenzing AG. The weight of the flexible fiber felt produced by the needle punching operation is about 400 grammes/sqm and the gauge about 3.5 mm. These polyimide fibers are suitable for use in filter units operating at temperatures up to about 200° C. These fibers moreover are very suitable for use in conditions where chemicals are present and also they are not soluble in any known solvent.

Alternatively, a non-woven fiber felt may be used comprising polyphenylene sulphide resin fibers of 3.3 decitex and 50 mm length, such fibers being supplied under the designation Ryton PPS fibers by Phillips Fibers Corporation. The weight and gauge of the flexible fiber felt produced is generally similar to that of Example 1 and the fibers are suitable for use in filter assemblies operating at continuous temperatures of up to about 180° C. These fibers moreover are very suitable for use in conditions where chemicals are present.

Again, the material used may be produced from a blend of 50% by weight 1.5 decitex/50 mm and 50% by weight 3.0 decitex/50 mm staple polyester fiber or again a fiber felt may be used which comprises a blend of polyester fibers and polypropylene fibers in a ratio of 70:30 parts by weight, the polyester fibers being of 1.5 decitex/50 mm and the polypropylene fibers 2.8 decitex/50 mm. In each of these cases the filter units would be intended for use at lower temperatures than the first-mentioned units. Again, moreover, bi-component fibers may be used, especially those of the concentric type having a core of a higher melting point and sheath of a lower melting point.

Whichever material is used, it can be rendered rigid, and thus self-supporting, by the application of heat and, in carrying out the method in accordance with the invention, the two portions 14 of sheet material are first formed into the corrugated configuration with intermediate and transversely extending lands, and are rendered rigid in such configuration. Thereafter the two portions are secured together along the lands 50, 52, 54 by any suitable means. Thus for example they may be secured together by adhesive bonding or by stitching or indeed by metallic fastenings, including eyelets and, in the case of the edges, metallic clip members, as will be described hereinafter. In addition, if desired, in the finished unit the portions may also be secured together, for additional security, along the peaks of the corrugations thereof.

Figure 2:
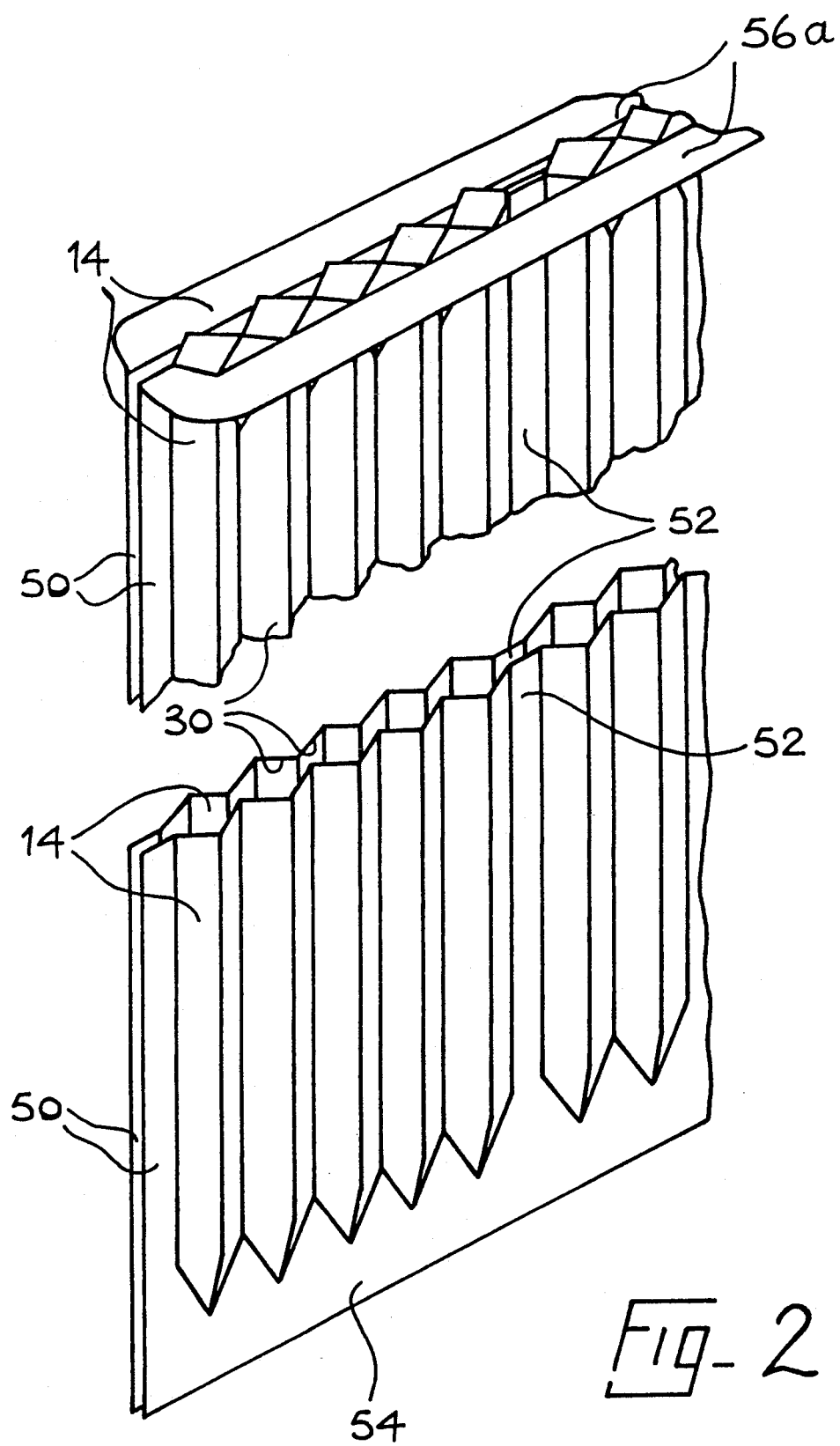
FIG. 2 is a view generally similar to FIG. 1, but wherein the forming of the sheet materials has been modified.

FIG. 2 shows an alternative unit which is generally similar to that shown in FIG. 1 but distinguished in that during the forming of each portion 14 and prior to its being rendered rigid, the land or flange 56 formed along the top edge of the portions is out-flanged (as shown at 56a in FIG. 2) and thus may provide a means for supporting the finished filter unit in a connection with a suction or other air-drawing source.

Figure 4:
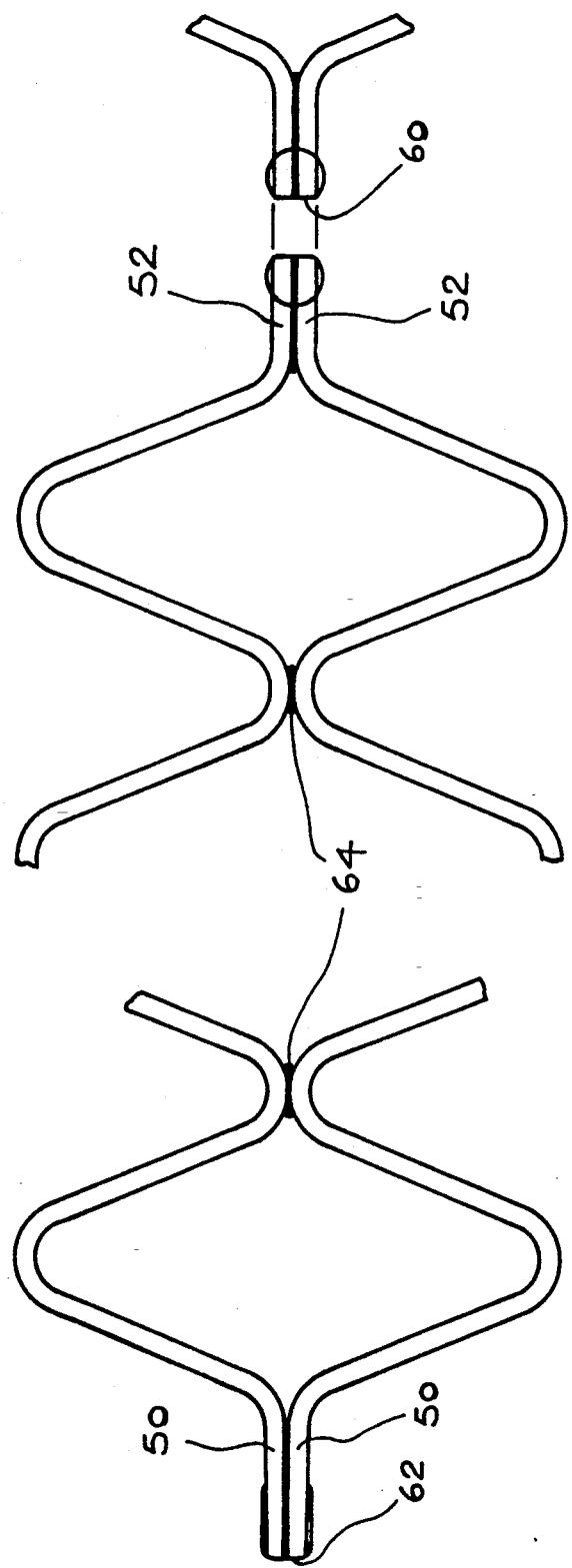
FIG. 4 is a sectional view through a unit made by a method in accordance with the present invention.

FIG. 4 shows a cross-sectional view through a finished filter unit in which the lands 52 are secured together by eyelets 60 while the lands 50 are secured together by an elongated metallic clip member 62. The peaks of the corrugations, as shown in this Figure, furthermore, are secured by adhesive designated 64.

Figure 5:
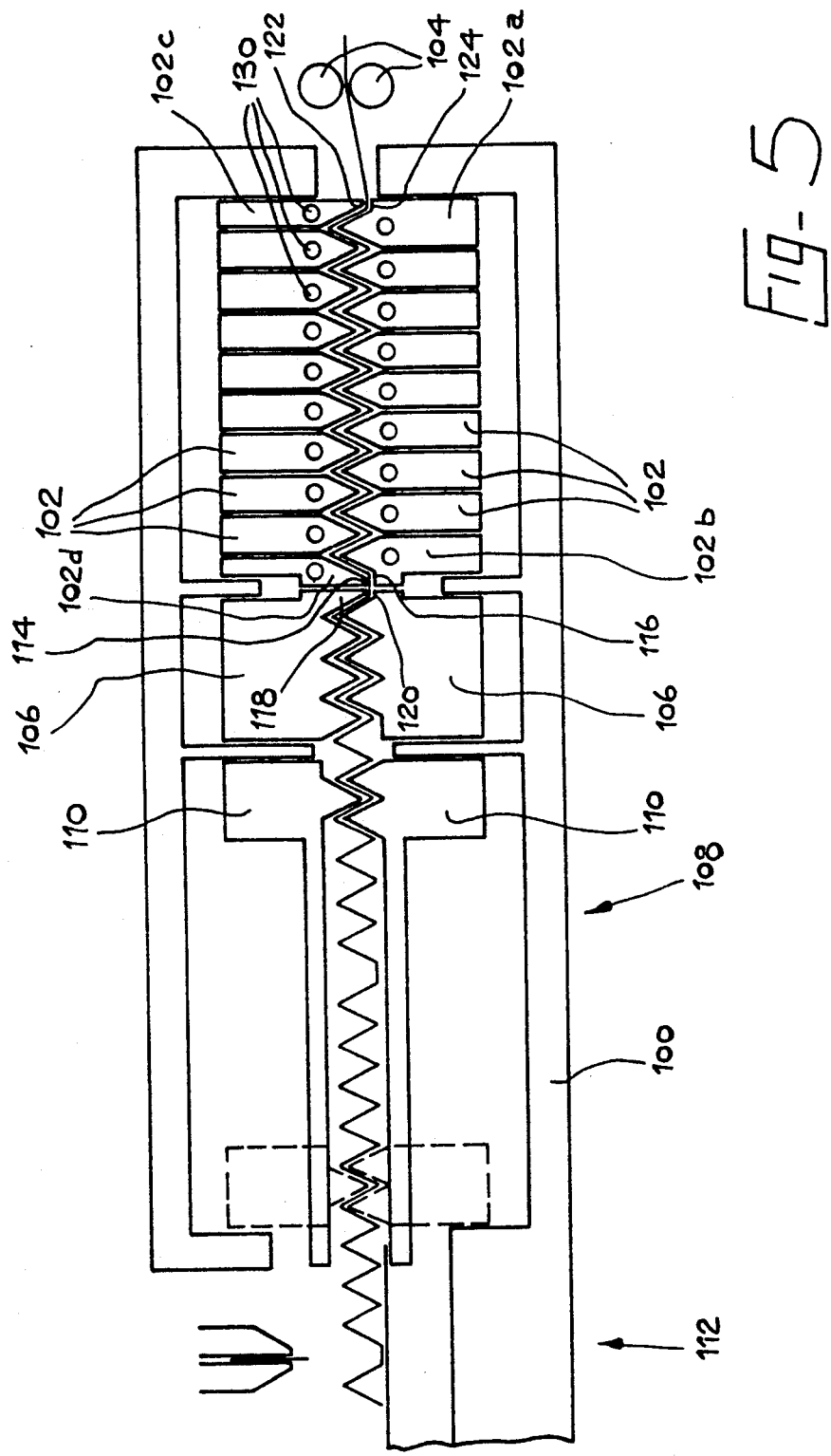
FIG. 5 is a schematic diagram of an apparatus in accordance with the invention.

For forming the fiber felt sheet material and rendering it rigid while in its formed configuration, an apparatus is used, as shown in FIG. 5 in a schematic form. The apparatus comprises a frame 100 at a right-hand end (viewing FIG. 5) of which is disposed a forming assembly comprising two sets of blade members 102, each blade member being elongated and having an edge portion, facing the other set, of triangular cross-sectional configuration, thus forming a peak and the side faces of each two adjacent blade members providing a valley bounded by two peaks, the arrangement being such that each blade member of one set is disposed opposite a valley of the other set.

The apparatus further comprises a pair of nip rolls 104 for assisting in the feeding of material from a continuous source thereof (not shown) to the forming assembly, nip rolls 104 being arranged "upstream" of the sets of blade members 102, while "downstream" of the sets of blade members is a clamp arrangement comprising two opposed clamp members 106 opposed surfaces of which are corrugated so as to receive therebetween a corrugated portion of the sheet material, as will be described hereinafter. Further downstream of the clamp members 106, furthermore, is a workpiece feeding device generally designated 108 comprising two opposed feeding members 110, the opposed surfaces of which respectively comprise a peak and cooperating valley, said members being mounted for sliding movement together in a direction away from the sets of blade members 102 whereby, with the blade members 102 and the clamp members 106 in a retracted condition, the sheet material can be fed through the apparatus from the continuous source thereof. The distance through which the members 110 move as aforesaid is fixed and corresponds to the length, in the feed direction, of the blade members 102.

Downstream of the workpiece feeding means 108, furthermore is severing means generally designated 112, said means comprising a vertically reciprocable blade extending transversely of the workpiece feed direction.

The left-hand (viewing FIG. 5) blade member 102d of the upper set is not formed with a peak but rather with a flattened ridge 114, while the left-hand member 102b of the lower set has formed therewith an integral flat surface 116 cooperable with the flattened surface 114. In addition, at the right-hand end of the cooperating surfaces of the clamp members 106 are further flattened portions 118, 120 which cooperate with the flat surfaces 114, 116 thus to provide, during the forming operation, a land 50 (or 52) extending parallel with the corrugations formed by the blade members and intermediate such corrugations, as described previously. Moreover, the cutting or severing means 112 is spaced, in the direction of work feed, from the surfaces 114–120 by a distance which is a multiple of the length, also measured in the work feed direction, of the sets of blade members 102. It will thus be appreciated that, as the work is fed, the lands 50 (or 52) provided by the surfaces 114–120 are disposed beneath the cutting or severing means 112.

It will also be noted from FIG. 5 that the right-hand blade member 102c of the upper set is also provided with a flattened surface 122 instead of a peak, corresponding to the flat surface 118 on the upper clamp member 106, and similarly the right-hand blade member 102a of the lower set is provided with a flat surface extension 124 cooperable with the flattened surface 122 and corresponding to the surface 120 of the right-hand end of the lower clamp member 106. Thus, in a forming operation, the surfaces 122, 124 cooperate to form part of a land or flange 50 (or 52) which, after the work has been fed through a predetermined distance as aforesaid is then disposed between the surfaces 118, 120 of the clamp members 106.

Figure 6:
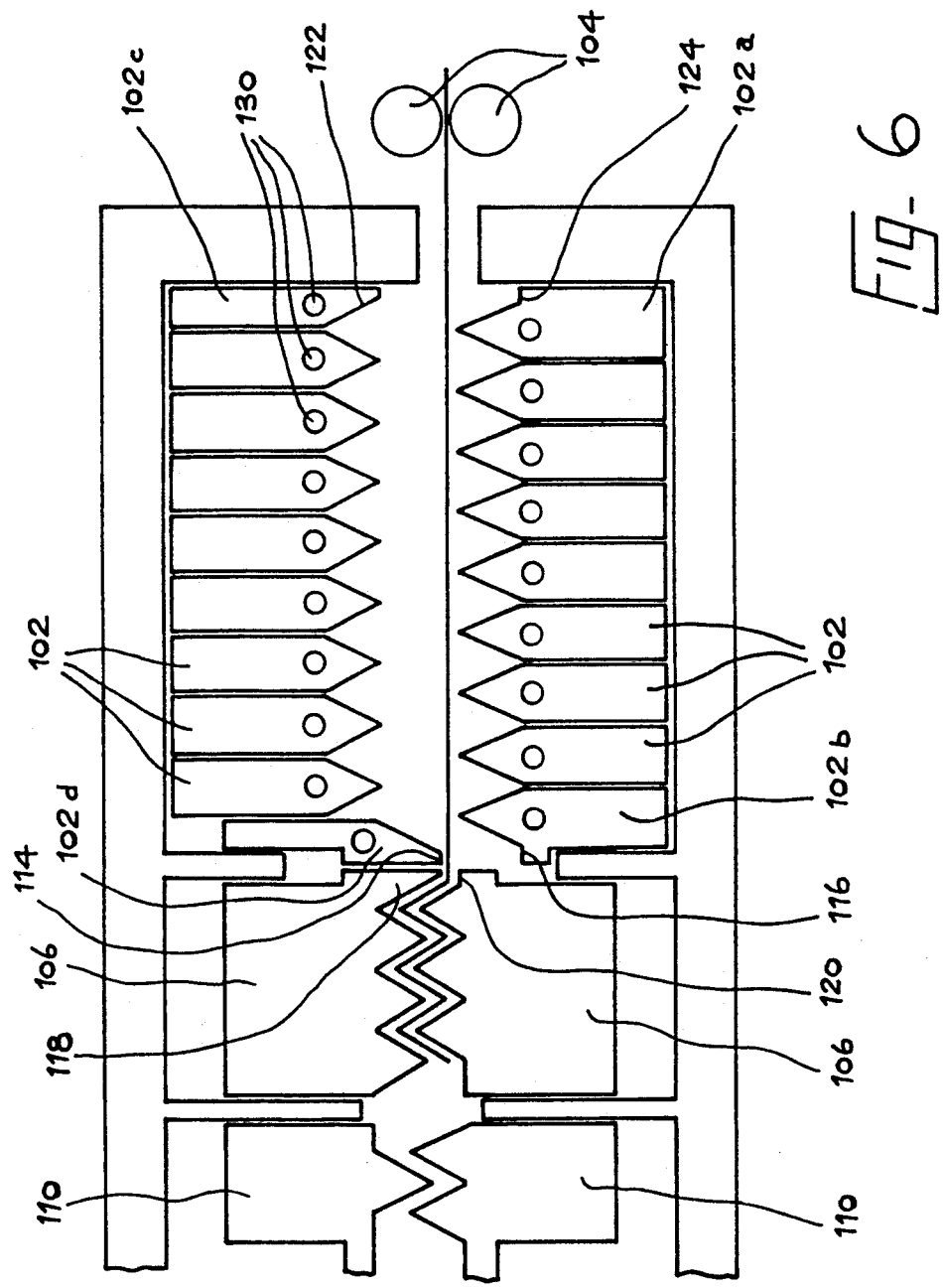
FIGS. 6 and 7 are views similar to FIG. 5, but showing a sequence of operations of said apparatus.
Figure 7:
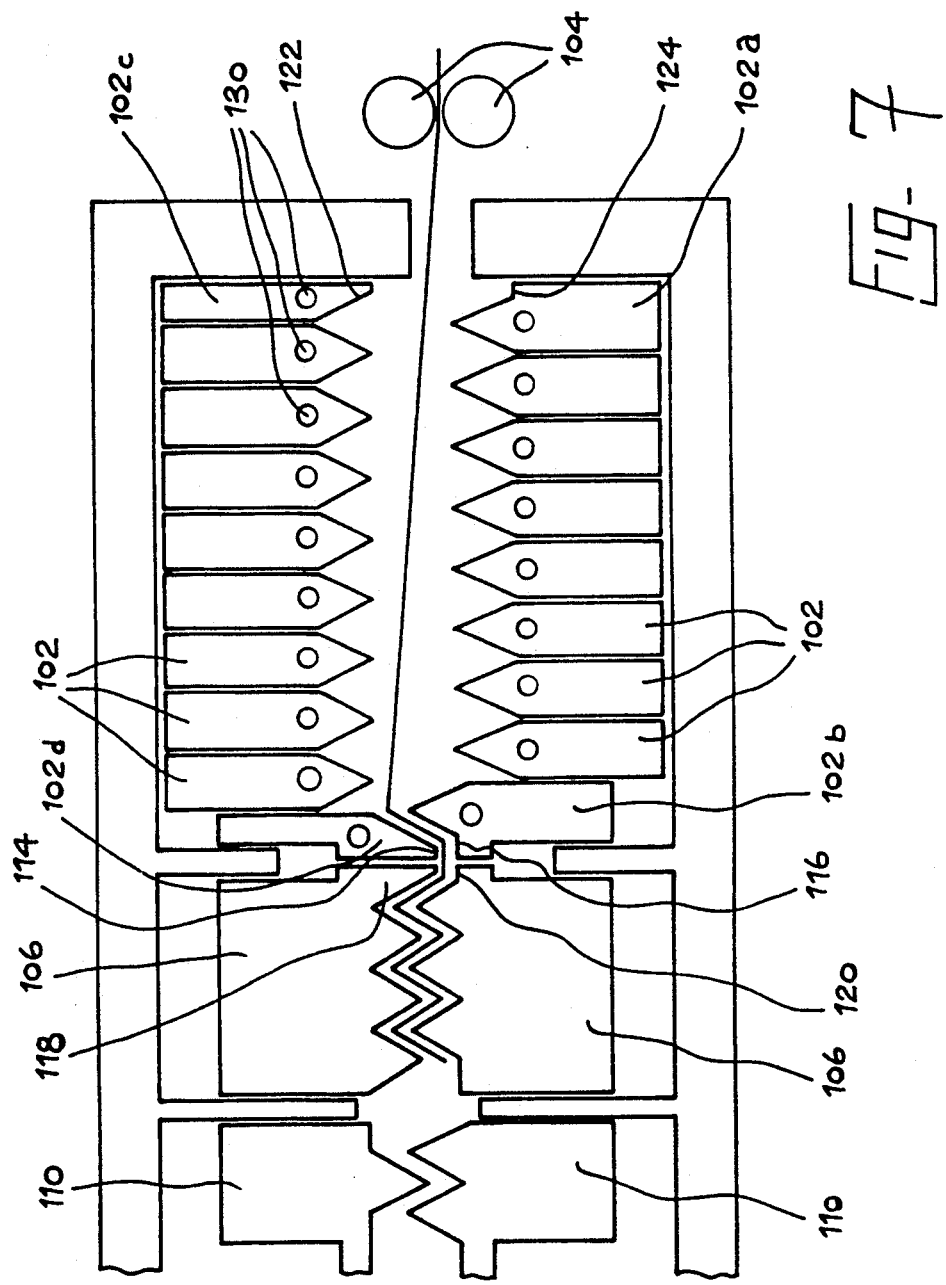

In the operation of the apparatus, the blade members 102 are individually advanced between a retracted position and an advanced position in which a length of the sheet material disposed therebetween is thus formed into a corrugated configuration as aforesaid. More particularly, with a portion of formed sheet material held by the clamp members 106, the left-hand blade member 102d of the upper set is first advanced into engagement with the sheet material (as shown in FIG. 6) and thereafter the left-hand member 102b of the lower set is advanced thus to form a first half of a first corrugation in the sheet material (see FIG. 7). Each of the blade members is then in sequence, starting from the left-hand side, moved into engagement with the sheet material, which is thus progressively drawn from its continuous supply, and more particularly the blade members of the two sets are advanced alternately, the last blade member to be advanced thus being the right-hand end member 102c of the upper set.

The blade members are each provided with heating means 130 for heating the sheet to an appropriate temperature such that upon being held in this corrugated configuration by the blade members, the sheet material is rendered rigid. The period during which the material is thus held is also of course determined according to the nature of the material itself.

At the end of this stage of the operation in which forming and rendering rigid of the material takes place, the workpiece feed members 110 are moved to engage a previously formed portion of the material as aforesaid, the clamp members 106 then being retracted. The feed members 110 are then advanced through the predetermined distance and the most recently formed portion of the sheet material is thus advanced from between the blade members, drawing another portion of unformed material between said members. The clamp members 106 are then once more advanced into an operative, clamping, condition, the feed members 110 are retracted out of engagement with the formed material and are thereafter returned to their initial position. Depending upon whether the land 50 (or 52) now disposed beneath the cutting or severing means 112 is to form an end portion of the finished workpiece or merely an intermediate land, the cutting or severing means is appropriately actuated or remains unactuated.

The operating cycle is then repeated.

For forming the lands 54 on the sheet material, each blade member of the upper set has formed at one end thereof a flattened portion 126 while each blade member of the lower set has a cooperating flattened surface 138. As will be seen from FIG. 3, the surface 126 lies in the plane of the peak of the portion of triangular cross-section of the blade member 102 of the upper set, while the flattened surface 128 lies in the plane of the bottom of the portion of triangular cross-section (and thus of the valleys formed between adjacent blade members) of the lower set. Thus, in the finished formed portion 14, the land or flange 54 will lie in the same plane as the lands 50, 52.

Figure 3:
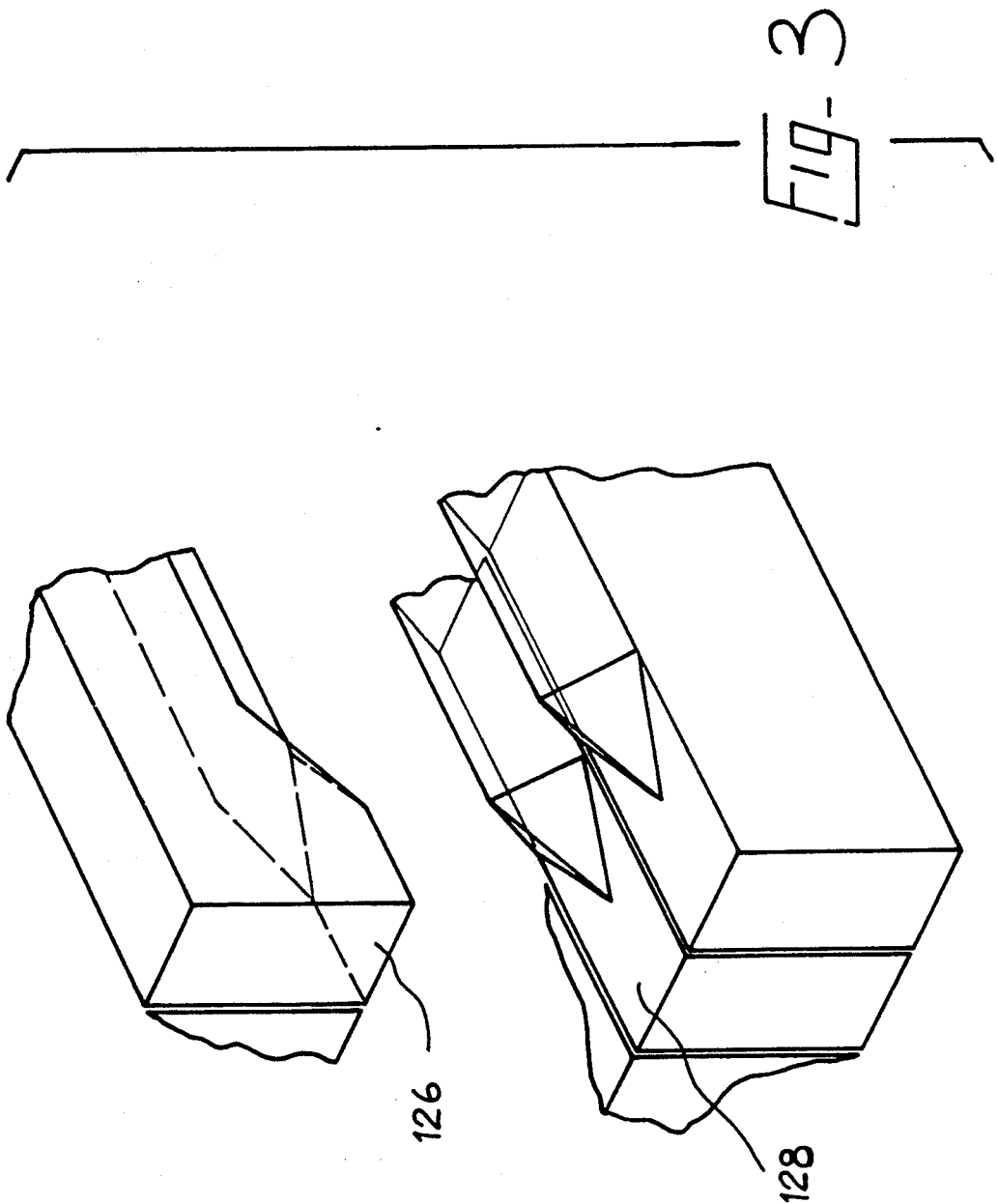
FIG. 3 is a fragmentary perspective view of opposed blade members forming part of a forming assembly by which sheet material can be formed.

At the opposite end of each blade member 102, furthermore, is formed a further flattened surface (not shown) generally similarly to those shown in FIG. 3, except that the flattened surface provided on each blade member of the upper set lies in this case in the plane of the bottom of the portion of triangular cross-section, while in the case of the lower set the flattened surface lies in the plane of the peak provided by the portion of triangular cross-section. Thus, in the finished formed portion the land or flange 56 will lie in the plane of the bottoms of the valleys of corrugate configuration.

As an alternative to such an arrangement as described in the last paragraph, in order to produce an outwardly flanged portion as described with reference to FIG. 2 above, the appropriate ends of the blade members terminate in a perpendicular plane (as opposed to the tapering of the triangular cross-sectional portions, as illustrated in FIG. 3) and thus, when the sheet material has been trapped between the blade member as described above, a portion thereof projects free beyond the end of the blade members, this projecting portion then being folded over the end of the blade members and pressed against a flat forming surface which extends in said perpendicular plane. In this way a rigid integral outflange 56a can be provided.

In carrying out the method in accordance with the present invention, it will be plain, the apparatus above-described can thus readily be used. In particular, it will be appreciated that using such apparatus a sheet material portion is fed, from a continuous supply thereof, between the blade members 102, by which it is progressively clamped, thus to form a corrugated configuration, and at the same time, by reason of the blade members being heated to an appropriate temperature the material is treated to render it rigid. Because of the particular configuration of the end blade members 102a-d, moreover, at spaced intervals along the length of the sheet material, intermediate the corrugations, lands 50, 52 are formed, for the purposes described above. At the same time, by reason of the flattened surfaces 126, 128, further lands 54 are formed, extending transversely of the corrugations and in the same plane as the lands 50, 52, and in addition still further lands 56 can be formed at the opposite ends of the corrugations, again extending transversely thereof, and also extending either in the plane of the bottoms of the valleys of the corrugations or perpendicularly thereto, according to whether the thus formed land or flange is folded outwards.

The apparatus allows a continuous through-feed method to be practiced, using a fabric sheet material in a continuous roll form, and the individual portions can be cut, centrally of one of the lands 50 (or 52) formed as aforesaid, by the severing means 112 according to the lengths required.

When the portions of material have been formed, rendered rigid and severed as aforesaid, moreover, two portions are then arranged in face-to-face contact, with their corrugations parallel and with the peaks thereof in opposed relationship and the valleys between the peaks in register such that each valley provides a passage through which, in the finished unit, air to be filtered can pass and be drawn off, but which prevents the passage therethrough of dust and/or other debris, and the two portions are then secured together through the various lands 50, 52, 54 by any preferred method, e.g. adhesive bonding, metallic fastenings or stitching.

In the case where the lands 56 extend in the plane of the bottoms of the valleys, moreover, in carrying out the method, a suitable connection is then disposed in the opening formed by the lands 56. In manufacturing the alternative embodiment of FIG. 2 the out-flanged portion 56a of the finished unit itself enables a connection to be made with a suction or air-drawing source. Moreover, if desired, such out-flanged portion may be reinforced by one or more layers of a similar or the same material secured thereto by any desired means.

I claim:

1. A forming assembly for forming flexible non-woven fabric sheet material to provide corrugations therein and subsequently for treating such material while in its corrugated configuration, comprising
a clamp arrangement having two elongated clamp members each having a flat clamp surface,
two opposed corrugating tools aligned with one another such that the peaks of the corrugating surface of one tool mate with the valleys of the corrugating surface of the other, and
means for effecting relative movement of approach and separation between the clamp members and also between the corrugating tools, whereby material disposed therebetween can be formed into a corrugated configuration with a land extending parallel to the corrugations, wherein each corrugating tool comprises a plurality of elongated blade members, each extending parallel with the clamp members and each having a material-engaging end portion of generally triangular cross-section thus to provide an elongated peak and a valley being thus formed between the peaks of adjacent blade members, and wherein with a portion of sheet material held clamped by the clamping members and extending between the corrugating tools, the means for effecting relative movement between said tools is effective to advance each blade member of at least one of said tools in sequence, starting with the blade member whose peak is most closely adjacent the clamp members and thereafter the next most closely adjacent and so on.

2. An assembly according to claim 1 wherein the blade members of both tools are thus advanced in sequence, the arrangement thus being such that alternately a blade member of one tool and then a blade member of the other are thus advanced.

3. An assembly according to claim 1 wherein one of the clamping members is formed integral with one of the blade members of one of the tools, and the other tool has associated with it a separate clamping member having a cut-away portion forming a side of a valley cooperating with the peak of said one blade member of said one of the tools.

4. An assembly according to claim 1 wherein heating means is provided for heating the tools to a temperature at which the fabric sheet material therebetween is rendered rigid.

5. An assembly according to claim 1 wherein each blade member has a flat forming face extending transversely of the corrugations adjacent one end thereof whereby as the blade members are moved together an edge portion of the material is clamped between the flat forming surface of the cooperating members thus progressively to form a land along said edge portion.

6. An assembly according to claim 5 wherein the flat surfaces of the blade members of one of the tools lie in the plane of the bottoms of the valleys of the corrugated surfaces thereof, while those of the other of the tools lie in the plane of peaks of the corrugated surfaces thereof.

7. An assembly according to claim 6 wherein each blade member has a further flat forming surface extending transversely of the corrugations adjacent the other end thereof for forming a land along the opposite edge portion of the material, and wherein in the blade members where the flat surfaces adjacent one end are in the plane of the peaks of the corrugated surfaces thereof, those adjacent the other end are in the plane of the bottoms of the valleys of said surfaces, and vice versa.

8. Apparatus suitable for use in the manufacture of filter units from flexible non-woven fabric sheet material, comprising
a forming assembly by which such sheet material can be formed to provide corrugations therein and subsequently be treated while in its corrugated configuration, wherein the forming assembly comprises
a clamp arrangement having two elongated clamp members each having a flat clamp surface,
two opposed corrugating tools each comprising a plurality of elongated blade members, each extending parallel with the clamp members and each having a material-engaging end portion of generally triangular cross-section thus to provide an elongated peak and a valley being thus formed between the peaks of adjacent blade members, said tools being aligned with one another such that the peaks of the corrugating surface of one tool mate with the valleys of the corrugating surface of the other, and means for effecting relative movement of approach between the clamp members and also between the corrugating tools, in such a manner that, with a portion of sheet material held clamped by the clamping members and extending between the corrugating tools, the blade members of at least one of said tools are advanced in sequence, starting with the blade member whose peak is most closely adjacent the clamp members and thereafter the next most closely adjacent and so on, whereby material disposed therebetween can be formed into a corrugated configuration with a land extending parallel to the corrugations, the apparatus further comprising means for feeding the material through the apparatus from a continuous supply, said means comprising cooperating members providing a complementary peak-and-valley arrangement for engaging in one or more corrugations in the formed rigid material, together with means for moving the members bodily through a predetermined distance equivalent to the dimension of the tools as measured in the direction of feed of the material, whereby the material is fed section-by-section through the apparatus, each section comprising a plurality of configurations with a parallel land at one end thereof, and severing means for severing formed rigid portions from the material.

9. Apparatus according to claim 8 wherein the severing means is disposed in a position such that as each section of material is fed as aforesaid the land provided by the clamping means is positioned in opposed relation with the severing means and thus the section is severed along said land.

10. Apparatus according to claim 8 wherein a further clamp arrangement is provided, comprising further cooperating members also providing a complementary peak-and-valley arrangement and engageable also with a formed rigid portion of the material, whereby the material is held in position during return movement, out of engagement with the material, of the cooperating members of the feeding means.

11. An apparatus according to claim 8 wherein the means for feeding the material also comprises means for holding the material along outside edges thereof along the feed direction.

* * * * *